United States Patent [19]
Britt

[11] 3,736,750
[45] June 5, 1973

[54] POWER PLANT

[75] Inventor: Jack Britt, Ambergate, Derbyshire, England

[73] Assignee: Rolls Royce Limited, Derby, England

[22] Filed: Mar. 12, 1971

[21] Appl. No.: 123,753

[52] U.S. Cl..................60/226 A, 60/230, 60/39.29, 137/15.1
[51] Int. Cl..............................................F02k 3/02
[58] Field of Search....................60/226 A, 39.29, 60/230, 35.6 LL, 262, 240, 237, 233, 229; 137/15.2, 15.1

[56] References Cited

UNITED STATES PATENTS

| | | | |
|---|---|---|---|
| 3,623,328 | 9/1970 | Pike | 60/226 |
| 3,386,247 | 6/1968 | Gross et al | 60/226 |
| 2,973,921 | 3/1961 | Price | 60/229 |
| 2,280,835 | 4/1942 | Lysholm | 60/229 |
| 3,167,911 | 2/1965 | Sandre | 60/262 |
| 3,608,314 | 9/1971 | Colley | 60/230 |

FOREIGN PATENTS OR APPLICATIONS 1,029,081   5/1953   France..................................60/262

*Primary Examiner*—Carlton R. Croyle
*Assistant Examiner*—Warren Olsen
*Attorney*—Cushman, Darby & Cushman

[57] ABSTRACT

A power plant for an aircraft comprises a gas turbine engine which in at least one mode of operation is run at maximum continuous speed, variations in overall thrust being effected by the use of a thrust reversal device. A variable area intake is provided, and because of the high mass flow in this mode, need not produce a very large reduction in the throat to achieve intake silencing.

5 Claims, 1 Drawing Figure

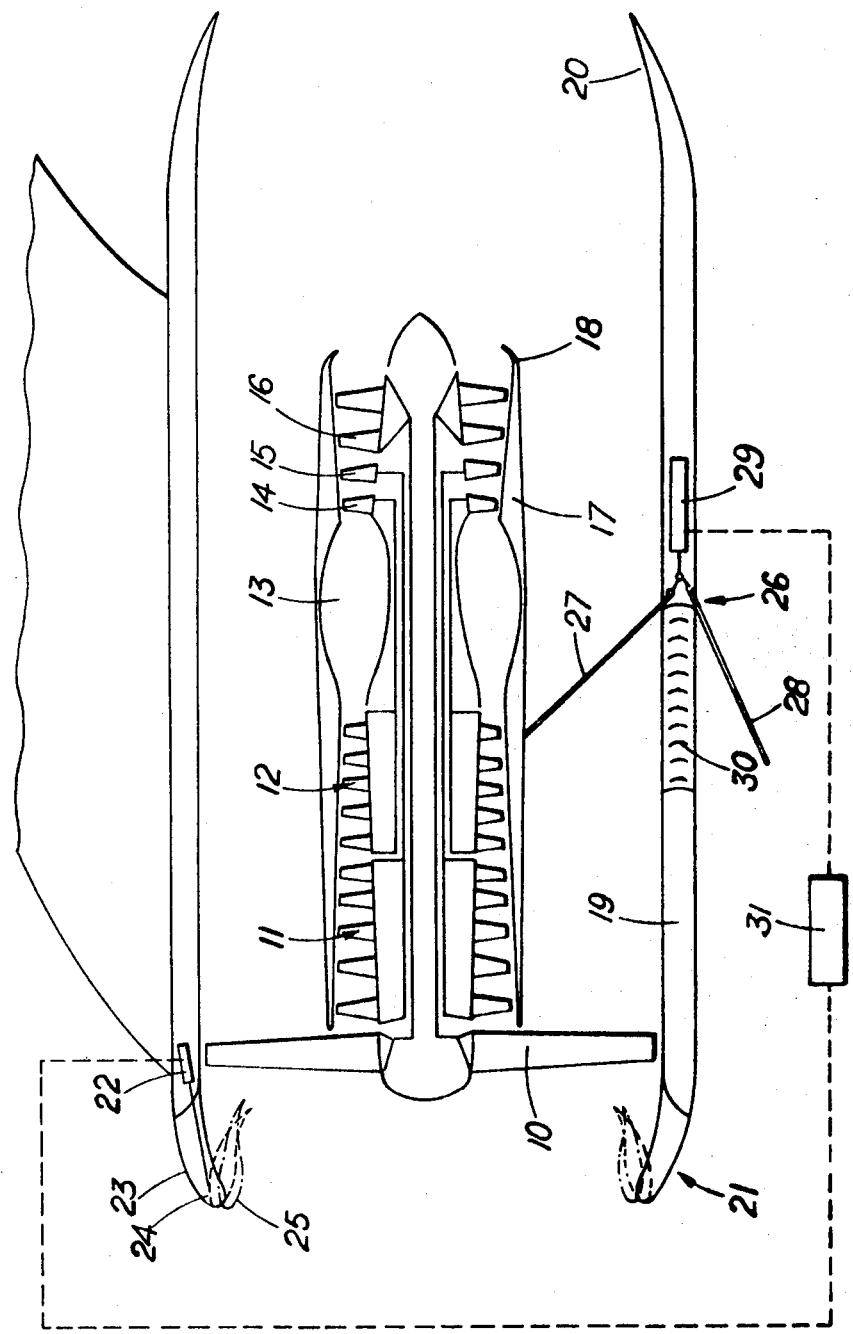

POWER PLANT

This invention relates to a power plant comprising a gas turbine engine.

In a gas turbine power plant for aircraft, reduction of noise emission to the ground is of great importance, both for take-off and landing. In the landing case, a large portion of the emitted noise which reaches the ground passes through the intake of the power plant. It has been proposed to provide a variable geometry intake which may be so reduced in area as to increase the speed of airflow to such a degree as to reduce the amount of noise escaping through the intake. However, in the landing case the engine may not be run at maximum speed, consequently the mass flow through the intake may be relatively small and the intake must then provide an unacceptably large reduction in area to effect silencing.

The present invention comprises a power plant in which intake silencing may be effected without an unacceptably large degree of intake area variation.

According to the present invention a power plant comprises a gas turbine engine having a variable area intake, a thrust reversal device which is adapted to reverse a selected fraction of the thrust producing exhaust of the engine and control means adapted to cause the power plant to produce the required thrust in one mode of operation by running the engine at maximum continuous speed, reversing a fraction of the thrust producing exhaust of the engine to leave a reduced thrust of the required amount, and closing down the intake to produce a flow velocity of above Mach 0.8 in the intake.

Preferably the engine comprises a by-pass engine, and the thrust reverser may reverse the by-pass air alone.

Thus the by-pass engine may comprise a mixed flow from the exhaust, so that the reversal of the fan air causes the primary flow thrust through the final nozzle to be reduced because of the over-size of the nozzle, and causes the fan to overspeed to increase fan reverse thrust.

According to another aspect of the invention a method of operating a gas turbine engine power plant having a variable area intake and a thrust reverser adapted to reverse a pre-determined fraction of the thrust producing gas of the engine comprises running the engine at a high speed, operating the reverser to reverse part of said gases and reduce the overall thrust of the power plant to a predetermined value, and reducing the intake area to provide a velocity of airflow of at least Mach 0.8 through the intake.

The invention will now be particularly described merely by way of example, with reference to the accompanying drawing, which is a diagrammatic sectional view of a power plant according to the present invention.

In the drawing the power plant comprises a gas turbine engine having in flow series a fan 10, intermediate pressure compressor 11, high pressure compressor 12, combustion section 13, high pressure turbine 14, intermediate pressure turbine 15 and low pressure turbine 16.

The high, intermediate, and the low pressure turbines are drivingly interconnected with the high pressure compressor, intermediate pressure compressor, and fan respectively.

The core section of the engine comprising the intermediate pressure and high pressure compressors, combustion section, and all the turbines is encased within an inner casing 17, the casing 17 having at its outlet a mixer nozzle 18 through which the primary flow of engine gas passes. The fan 10 compresses air which flows within a fan casing 19, and part of its output forms the intake air for the core section while the remainder forms a by-pass flow through the annulus between the inner casing 17 and the fan casing 19. At the mixer nozzle 18 the flows of by-pass and primary air mix, the mixed gases then exhausting to atmosphere through a propulsion nozzle 20 which forms the downstream extremity of the fan casing 19.

At the upstream extremity of the fan casing 19 a variable geometry intake 21 is formed. The intake comprises a plurality of sections, movable by rams 22, which combine to form an annulus, and which have three operative positions.

In the first, cruise position (shown in full lines at 23) they form a continuation of the fan casing 18 and the aerodynamic shaped leading edge of the annulus forms the leading edge of the casing. In the second, take-off condition (shown in broken lines at 24) the sections are pivoted approximately about their leading edges so that their trailing edges converge, thus forming a convergent main intake with a good contraction ratio and consequently good flow-smoothing properties, and an annular or part annular slot just downstream of the main intake which gives a greater overall area to permit high mass-flow.

In the third, approach and landing condition (shown in chain dotted lines at 25) the leading edges of the sectors are also moved inwardly forming an intake of reduced area and high velocity. The areas and mass flow are arranged to give a velocity of above Mach 0.8 (preferably about Mach 0.85) at the intake throat; the emission of noise through the intake is then reduced since the noise has very little speed differential above the airflow. This condition may be used for take off when noise reduction is required.

In addition to the variable area intake, control of the fan airflow is effected by a thrust reverser 26 housed in the fan casing 19 and comprising a pair of sets of flaps 27 and 28 movable by rams 29 to a predetermined position between one extreme position in which they form a part of the inner and outer wall respectively of the casing 19 and the position shown in which the set 27 obturates or partially obturates the fan duct while the set 28 directs the diverted gases forwardly to produce reverse thrust. The thrust reverser 26 may be of the type shown in detail in the common assignee's U.S. Pat. No. 3,475,913 issued Nov. 4, 1969 to Mortlock et al and to this extent such patent is incorporated by reference. Thus the reverser can provide various degrees of reversal of the thrust of the fan stream from nothing up to a full reversal. It should also be noted that reversal of the fan stream implies that the final nozzle 20 becomes too large for the primary flow alone, consequently the thrust from this flow is reduced. This also causes the fan to overspeed and increase its thrust. Sets of cascades 30 are also incorporated in the openings in the fan casing to improve the turning of the gases.

To provide control of the variable features of the power plant, an interconnecting control device 31 is provided which co-ordinates operation of the rams 22 and 29. Control of the engine is effected as follows:

For the take-off condition, the engine is run at maximum continuous speed with the variable intake held in its position 24 and the reverser completely inoperative. The engine will thus produce maximum thrust with a good intake shape for low speed; since the aircraft will be directed upwards immediately after take-off there is no necessity to silence the intake.

For the cruise condition the engine is run at cruise speed while the intake is held in its position 23 and the reverser is inoperative. The intake thus produces low aerodynamic drag, while the mixing of the fan and primary stream produces an increase in efficiency compared with the unmixed type of power plant.

For the approach condition the intake is held in a position 25 while the engine is again run at maximum speed.

Since the thrust required is less than the maximum, the reverser is operated to reverse a fraction of the fan stream to give the required overall thrust; it will be noted that the reverser only affects cold air and consequently hot gas ingestion is avoided.

Running the engine at maximum speed produces a large mass flow through the intake; this enables the intake to be partly choked with a reasonable degree of area reduction. If the necessary thrust were achieved by slowing the engine, the reduced mass flow would require an intolerably large reduction in intake area to provide the required Mach 0.8 or above at the throat.

When the aircraft has touched down (or if desirable just before this point) the reverser is moved to its fully operative position. All the fan air is reversed, and the mis-matching of the final nozzle with the primary flow causes both the primary thrust to be reduced and the pressure drop across the low-pressure or fan turbine 16 to be increaed, over-speeding the fan and increasing the fan flow and consequently the reverse thrust.

The arrangement described also provides a very quick reaction capability to an emergency which requires that the aircraft should abort a landing. In this case, by merely moving the reverser to its inoperative position, and if necessary moving the intake to its position 24, maximum thrust is available from the engine as it is already running at near full speed this will speed up the reaction time by avoiding the engine acceleration delay.

It should be appreciated that a similar system could be used with a non by-pass engine; however the advantages occuring would not be so great.

I claim:

1. A power plant comprising: a casing having a variable air intake at its upstream end and a propulsion nozzle at its downstream end, means to vary said air intake between an unobturated position and a selected position of obturation; a gas turbine engine positioned within said casing and including compressor means, combustion means and turbine means in flow series; thrust reverser means for reversing a selected proportion of thrust-producing exhaust of said engine; means to operate said thrust reverser means between an inoperable position and a selected position of thrust reversing; and control means interconnecting said means to vary said intake and said means to operate said thrust reverser; said last-mentioned control means being operable when said engine is running the maximum continuous speed to at least simultaneously cause said thrust reverser means to move to a position to reverse a fraction of said thrust-producing exhaust of said engine whereby thrust is reduced a required amount and to operate said means for varying said intake to a position where said intake is obturated sufficient to produce a flow velocity of above Mach 0.8 in the intake.

2. A power plant as claimed in claim 1 and in which said engine comprises a by-pass engine.

3. A power plant as claimed in claim 2 and in which said reverser means reverses only the by-pass air.

4. A power plant as claimed in claim 3 in which said engine comprises a mixer nozzle at its downstream end for mixing primary flow gases with bypass air so that mixed flow of bypass air and primary flow gases flow in normal operation through said propulsion nozzle, and when said reverser means reverses at least a portion of bypass air, the primary flow of gases through the propulsion nozzle is reduced because of oversize of the propulsion nozzle for primary flow gases alone.

5. A power plant as claimed in claim 4 in which said compressor means of said engine includes a fan for compressing bypass air and in which said turbine means includes a low pressure turbine for driving said fan, and in which said casing is an outer fan casing for bypass air, said reverser means reversing bypass air to cause a pressure drop across said low pressure turbine due to oversize of said propulsion nozzle, said pressure drop causing over-speeds of said fan.

* * * * *